March 25, 1969  J. E. SHULER  3,434,571

MAGNETIC OPERATED LOCKING DEVICE

Filed March 5, 1968

INVENTOR.
James E. Shuler
BY James E. Shuler

United States Patent Office 3,434,571
Patented Mar. 25, 1969

3,434,571
MAGNETIC OPERATED LOCKING DEVICE
James Edward Shuler, 304 Flaxen Circle,
Las Vegas, Nev. 89107
Filed Mar. 5, 1968, Ser. No. 710,691
Int. Cl. F16d 65/28, 63/00, 65/00
U.S. Cl. 188—69                                1 Claim

ABSTRACT OF THE DISCLOSURE

This invention relates to a magnetic operated locking apparatus mounted on a four-wheel cart, such as a grocery or shopping cart, which prevents the rotation of the wheels when passing over a metal bar in or on the ground located at the perimeter of the property, thus discouraging the removal of the cart from the premises.

---

Figure 1:
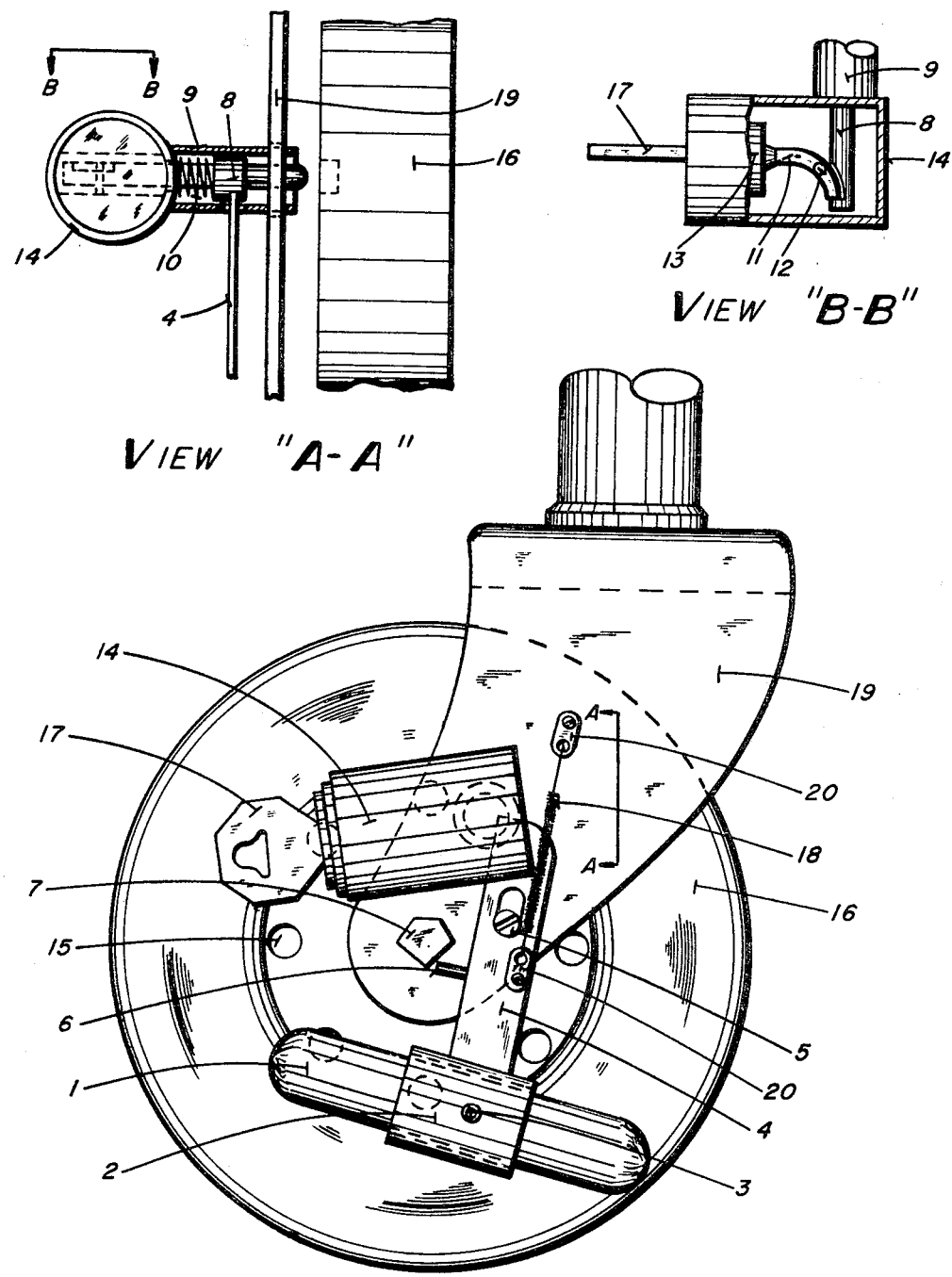

The magnetic operated locking device arose from the fact that various stores throughout the country are losing grocery carts at an estimated cost, by the insurance companies, of over one million dollars annually. The insurance companies feel that the magnetic operated locking device would cut this cost down to less than 10% of that figure.

The magnetic operated locking device; of which all parts are made of metal, preferably of aluminum, housed in a container (at the option of the perspective purchaser) made of metal, preferably of aluminum, is for the purpose of locking any movable cart with wheels.

The said invention's purpose is to prevent the removal of the cart from the premises, unless consent is given by the proprietor, by locking automatically either one or both the rear wheels of the cart depending on how many of the magnetic operated locking devices are purchased by the perspective purchaser for each cart at his option. The cart shall remain locked until the proprietor resets the magnetic operated locking device.

With the above and other objects in view as may appear hereinafter reference is drawn to the accompanying drawing in which: FIGURE 1 is the side view of the right rear wheel of the cart with the magnetic operated locking device mounted in position with the magnetic operated locking devices container removed for clarity. View A—A is a partial front view looking into the front of the magnetic operated locking device. View B—B is a partial top view looking into the top of the magnetic operated locking device.

The magnetic operated locking device operation procedure and detailed description is as follows:

The magnetic operated locking device shall be installed on the outside of either one or both the rear wheels of the cart at the option of the proprietor. When the cart is in use and an attempt is made to remove the cart from the premises the magnetic operated locking device shall automatically lock the cart, explained as follows:

When the cart passes over a metal, preferably iron, strip, previously installed, on or under the ground around the entire perimeter of the property, the magnet 1 is pulled down and to the rear, thus pulling down and to the rear the magnetic housing 2, which contains a set screw 3 (shown in FIGURE 1 exposed but in the actual item it shall be on the far side hidden) to hold the magnet 1 in place. The set screw 3 may also be used to adjust the magnet 1 back and forth. The magnet 1 shall also pull down and to the rear the rocker arm 4, which slides down and to the rear on the rocker arm pivot pin 5, which acts as a guide and pivot point for the rocker arm 4. When the rocker arm 4 moves down and to the rear the stop pin 6 clears the bottom of the head of the wheel axle 7, which is modified as shown in FIGURE 1.

Thus the rocker arm 4 falls out of a slot in the locking pin 8 located in the locking pin housing 9, as shown in view A—A. The locking pin 8 shall move forward by the pressure of the locking pin spring 10, as shown in view A—A. When the locking pin 8 moves forward it in turn drives the locking pin pivot arm 11, which pivots on the locking arm pivot pin 12 (as shown in view B—B) to the rear as shown in view B—B, pushing the lock plunger 13, a part of the lock 14, to the rear as shown in view B—B.

When the locking pin 8 aligns with any of the holes 15 in the wheel 16 the locking pin 8 shall enter the hole 15 and thus preventing the wheel 16 from turning.

To reset the magnetic operated locking device the proprietor shall push the lock plunger 13 forward, insert a master key 17 (only the proprietor has) into the lock 14 and turn the key 17 to the right. The proprietor shall then remove the key 17 thus the magnetic operated locking device is reset and ready for reuse.

When resetting the magnetic operated locking device the following operations occur:

When the lock plunger 13 is moved forward it in turn pushes the pivot arm 11 forward in turn pushing the locking pin 8 out of the hole 15 in the wheel 16 thus unlocking the wheel.

The retention spring 18, connected to the caster 19 with a clip 20 and connected to the rocker arm 4 with another clip 20 (as shown in FIGURE 1), pulls on the rocker arm 4. Along with the forward free weight of the rocker arm 4 and this pulling motion the rocker arm shall move up. Both motions must occur at the same time. With both these motions in action the rocker arm 4 shall move into the slot in the locking pin 8 and hold the locking pin 8 in place as shown in view A—A. The cart is then ready for reuse.

The following is a description and function of all the parts used in the magnetic operated locking device with reference in mind to the enclosed drawing:

1—"Magnet," permanent. The function of this part is to pull the rocker arm 4 down and to the rear when the magnet 1 passes over the metal strip on or under the ground.

2—"Magnet Housing," metal, preferably of aluminum. The function of this part is to hold the magnet 1 in place.

3—"Set Screw," metal, preferably of aluminum. The function of this part is to hold in place the magnet 1 or a means for adjusting the magnet 1 up or down.

4—"Rocker Arm," metal, preferably of steel. The function of this part is to held the locking pin 8 in place and to release the locking pin 8 when the magnet 1 is pulled down.

5—"Pivot Pin," metal, preferably of steel. The function of this part is to provide a means for allowing the rocker arm 4 to pivot back and forth and a guide for allowing the rocker arm 4 to move up or down.

6—"Stop Pin," metal, preferably of steel. The function of this part is to prevent the rocker arm 4 from moving to the rear from ajar thus locking the wheel 16.

7—"Wheel Axle," a part of the cart and modified as shown on FIGURE 1 of the enclosed drawing. It is also a stop means for the stop pin 6.

8—"Locking Pin," metal, preferably of steel. The function of this part is to move forward and enter the hole 15 in the wheel 16 thus in turn locking the wheel 16.

9—"Locking Pin Housing," metal, preferably of steel. The function of this part is to house and guide the locking pin 8 and the locking pin spring 10.

10—"Locking Pin Spring," metal, preferably of cold drawn steel wire. The function of this part is to move the locking pin 8 forward when the rocker arm 4 falls out of the slot in the locking pin 8.

11—"Locking Pin Pivot Arm," metal, preferably of steel. The function of this part is to drive the locking arm 8 out of the hole 15 in the wheel 16 when the lock plunger 13, a part of the lock 14, is pushed forward by the proprietor to reset the magnetic operated locking device.

12—"Locking Pin Pivot Arm Pin," metal, preferably of steel. The function of this part is to provide a pivot point for the locking pin pivot arm 11.

13—"Lock Plunger," a part of the lock 14. The function of this part is to move the locking pin pivot arm 11 forward.

14—"Lock," a lock from a automobile trunk or door part number 53 or any equivalent lock. The function of this part is to lock up the locking pin 8 and to keep it locked until the proprietor resets the magnetic operated locking device.

15—"Hole," located in the wheel 16. The function of the hole is to accept the locking pin 8 thus in turn locking the wheel 16.

16—"Wheel," a part of the said cart.

17—"Key," the function of this key is to lock and unlock the lock 14.

18—"Retention Spring," metal, preferably of cold drawn steel wire. The function of this part is to help pull the rocker arm 4 up when the magnetic operated locking device is reset and to hold the rocker arm 4 up when the cart hit a bump.

19—"Caster," a part of the cart. The function of this part is to provide a means for mounting the magnetic operated locking device.

20—"Clip," metal, preferably of steel. The function of this part is to provide a means for holding the retention spring 18, as shown in FIGURE 1.

While a particular embodiment of this invention has been shown and described, it is not intended to limit the same to the exact details of the construction set forth, and it embraces such changes, modifications and equivalents of the parts and their formation and arrangements as come within the preview of the appended claim.

I claim:

1. A locking means for the wheel of a movable cart comprising an apertured wheel member, support means supporting said wheel member, a locking pin supported on said support means for axial movement toward and away from said aperture, means biasing said locking pin toward said wheel member, a slot in said locking pin, a rocker arm pivotally and slidably mounted on said support means and in engagement with said slot, means biasing said rocker arm toward said locking pin, magnetic means fixed to said rocker arm to coact with a remotely located magnet attracting means to disengage said rocker arm from said slot so that the locking pin can be biased into locking engagement with the aperture in said wheel, and reset means to disengage the locking pin from engagement in said aperture.

References Cited

UNITED STATES PATENTS

| | | | |
|---|---|---|---|
| 1,709,527 | 4/1929 | Ford | 188—167 X |
| 1,814,841 | 7/1931 | Mosleh | 188—31 X |
| 3,031,037 | 4/1962 | Stollman | 188—69 X |
| 3,031,038 | 4/1962 | Chait | 188—69 X |
| 3,117,655 | 1/1964 | Skupas et al. | |
| 3,366,201 | 1/1968 | Pesta | 188—19 X |

GEORGE E. A. HALVOSA, *Primary Examiner.*

U.S. Cl. X.R.

188—167